B. L. PARKER.
DEVICE FOR OPERATING CAMERA SHUTTERS.
APPLICATION FILED JUNE 15, 1921.
1,420,137.
Patented June 20, 1922.
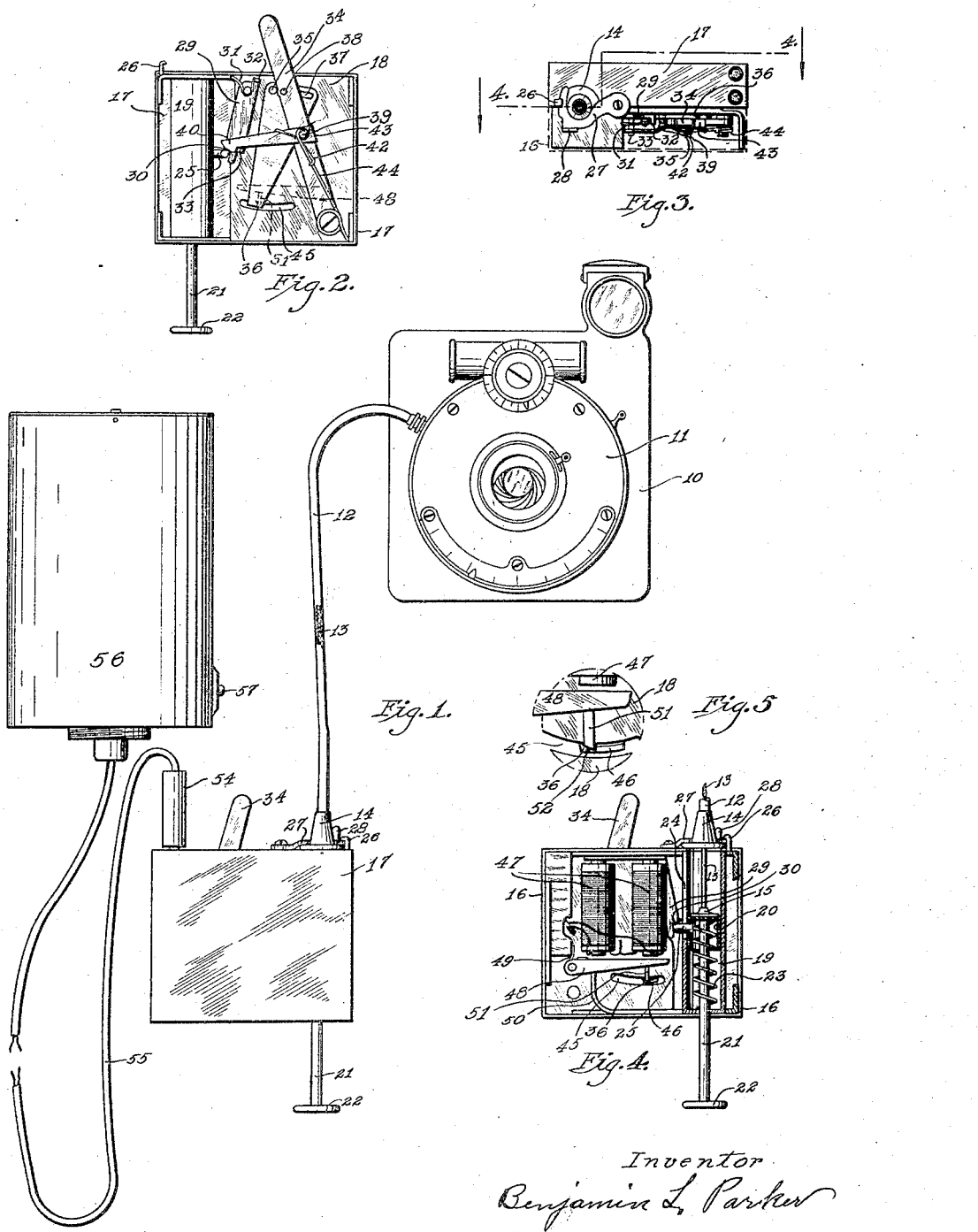
Inventor
Benjamin L. Parker
by Orwig & Hague, Attys.

UNITED STATES PATENT OFFICE.

BENJAMIN L. PARKER, OF MOSCOW, IOWA.

DEVICE FOR OPERATING CAMERA SHUTTERS.

1,420,137.	Specification of Letters Patent.	Patented June 20, 1922.

Application filed June 15, 1921. Serial No. 477,805.

*To all whom it may concern:*

Be it known that I, BENJAMIN L. PARKER, a citizen of the United States, and resident of Moscow, in the county of Muscatine and State of Iowa, have invented a certain new and useful Device for Operating Camera Shutters, of which the following is a specification.

The object of my invention is to provide means whereby a camera shutter may be actuated by an operator remote from the camera.

More specifically it is the object of my invention to provide a very compact and simple electrically controlled mechanism which may be attached to the shutter operating cord of a camera in such a manner that the shutter may be controlled by an operator from a distance remote from the camera, and in this connection to provide an electric control device having sufficient power to positively actuate the shutter, and yet capable of being controlled by means of a very small amount of electric current so that the operator may not be burdened with a heavy apparatus such as batteries, etc.

A further object is to provide a shutter controlling device designed to be attached to a flexible tube used in connection with shutter operating devices having a movable plunger, and to provide in such a mechanism a comparatively strong spring which is manually set and of a sufficient tension to operate the said plunger, and an auxiliary spring actuated mechanism which is also manually set for releasing the first said spring, the second manually operated mechanism being released by a delicate magnetic mechanism.

A further object is to provide in electrically controlled mechanism for camera shutters in the nature of an attachment having a spring actuated mechanism, improvements in the said mechanism whereby when they have been set they will not be easily disengaged for the purpose of preventing premature exposures.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a general view showing the manner in which my improved device is applied to the shutter control mechanism of a camera.

Figure 2 is a side elevation of the shutter controlling device with one of its side plates removed.

Figure 3 is a plan view of Figure 2.

Figure 4 is a sectional view taken on the line 4—4 of Figure 3.

Figure 5 is an enlarged detail view showing a portion of the magnetic armature and the hook device connected therewith.

The numeral 10 indicates the shutter board of an ordinary camera construction in which is mounted the shutter casing 11. The majority of the shutter casings now manufactured are provided with a flexible tube 12, which is provided with a push rod 13 having its inner end connected to a shutter operating mechanism in such a manner that when the rod is pushed or reciprocated within the tube, the shutter will be actuated.

Secured to the free end of the tube 12 is a finger piece 14 in which the free end of the shaft 13 is slidably mounted, the extreme end of the said shaft being provided with a knob 15, shown in Figure 4. The shutter is actuated by pushing the knob 15 toward the finger piece 14.

For operating this knob 15 from a distance remote from the camera, I have provided the following mechanism which comprises a casing 16 formed of sheet metal and preferably in two parts, one of which is telescopically connected to the other. One of these parts I have indicated by the numeral 16, shown in Figures 2 and 3, and the other by the numeral 17, shown in Figure 1. In Figures 2 and 3 the member 17 is detached.

Mounted in the member 16, I have provided a plate 18 which forms a frame upon which my improved mechanism is mounted. Mounted in one side of the casing 16 and adjacent to one edge of the plate 18, I have provided a cylinder 19 which is opened at one end and provided with a plunger 20, which is slidably mounted therein. The said plunger is provided with a stem 21 which extends outwardly through the opposite end of the cylinder 19 and is provided with a head 22. A spring 23 is mounted between the head of the cylinder 19 and the plunger 20 so that the said plunger may be moved toward the open end of the cylinder, the said movement being limited by the head 22.

The side of the cylinder 19 adjacent to the plate 18 is provided with a slot 24 through which a pin 25 extends, said pin being secured in the plunger 20. This pin serves as a catch for holding the plunger in its operative position.

Secured to the casing 16 adjacent to the opening of the cylinder 19 is a stationary hook 26 designed to receive a pivoted hook 27 when in one position of its movement. The hook 27 is provided with a lug 28 which serves as a thumb piece by which the hook may be operated. The hook 27 is so arranged that the flange of the finger piece 14 may be clamped over the end of the cylinder 19, as clearly shown in Figure 4.

The cylinder 19 is of such a diameter as to permit the knob 15 to enter and lay against the plunger 20. The said plunger is held to its inner limit of movement by means of a pawl 29 which is pivoted to the plate 18. The said pawl 29 is provided with a notch 30 designed to engage the pin 25. The said pawl is yieldingly held in engagement with said pin by means of a spring 31, one end of which is fixed to the casing 16, while the other end engages a pin 32 on said pawl. The said pawl 29 is also provided with a laterally extending pin 33 by which the said pawl is released from the pin 25, as hereinafter to be made clear.

Pivotally mounted on the plate 18, I have provided a lever 34, one end of which extends through a slot in the casing 16 to form a finger piece by which the said lever is operated.

Pivotally mounted by means of a pivot 35 beneath the lever 34, I have provided a cam plate 36, said pivot 35 lying close to the pivot of the pawl 29. This cam plate 36 is provided with a slot 37 which is designed to receive a pin 38 on the lever 34. The slot 37 is so arranged that as the lever 34 is swung about its pivot, the arch of the pin 38 will be in an angular line relative to the said slot so that as the said lever is moved, the plate 36 will also be swung about its pivot, as the pin 38 follows the said slot.

Pivotally mounted to the central portion of the lever 34 by means of a pivot 39, I have provided a hook 40 which extends toward the pin 33 and is designed to engage the said pin when in one position of its movement.

I have provided a small spring 42 for rotating the hook 40 in a direction toward the pin 33. This movement, however, is limited by means of a lug 43 which extends off the hook 40 and engages the edge of the lever 34. The said lever 34 is yieldingly held from the pawl 29 by means of a somewhat heavier spring 44 which is passed around the pivot of said lever and has one end engaging the casing while the other end engages the pin 39.

By this construction, it will be seen that the lever 34 may be held in the position shown in Figure 2 against the action of the spring 44 by merely holding the plate 36 against movement, inasmuch as the said lever 34 cannot move until the slot 37 falls in line parallel with the circular line inscribed by the travel of the pin 38 for locking the plate 38 in the position shown in Figure 2. For magnetically releasing it, I have provided a slot 45 in the plate 18 through which a laterally extending portion 46 of the plate 36 is extended.

On the opposite side of the plate 18, I have provided two electric magnets 47, adjacent to one end of which is pivotally mounted an armature 48. This armature is yieldingly held from the magnets by means of a spring 49. The armature is limited against outward movement by an inwardly extending lug 50 of the casing 16. The said armature 48 is provided with a pin 51 having its end beveled at 52, the pin 51 being of such a length that it will engage one edge of the member 46 so that the said member will be held against movement until the armature 48 has been moved inwardly, and the said pin caused to disengage the member 46.

The practical operation of my device is as follows;

When it is desired to operate the shutter of a camera at a point some distance from the camera, the casing 16 is grasped and the hook member 27 moved to an opened position. The knob 22 is then grasped and pulled outwardly so that the plunger 20 may be moved to its inner limit of movement with the pin 25 in the notch 30 of the pawl 29. The member 15 and the rod 13 are then inserted in the open end of the cylinder. The finger piece 14 is placed beneath said hook which is moved in position as shown in Figure 3. This leaves the said finger piece rigidly clamped to the casing, the complete outfit being of a size substantially as shown in the drawings, and can be easily suspended by the cord 12.

When the finger piece 14 is placed in position, the knob 15 will rest against the plunger 20. The lever 34 may then be grasped and moved to the position shown in Figure 2. This will permit the hook member 40 to move to the position back of the pin 33 and the member 46 to engage the inclined face 52 of the pin 51, and force the said pin inwardly, after which it will rest in behind the said member 46, as clearly shown in Figure 5 and lock the plate 36 in the position shown in Figure 2. The device is then set.

In this connection, it will be noted that at no time can the lever 34 be moved to its set position until it is ready to take the picture, as any slight jar of the armature 48 might cause the pin 51 to be disengaged from the member 46 and the plunger 20 released which would cause the camera to be exposed prematurely.

In this connection, it will also be noted that the said plunger 20 is positively locked in its open position until the lever 34 has been actuated, the tension of the said spring being so great against the pin 25 and the notch 30 that it will be easily disengaged.

The magnets 47 are provided with a switch or connection to which the plug 54 may be applied. This plug carries a cord 55 which may be of any desired length, having at its opposite end a battery 56, the small flash light battery being sufficient to operate the device. The timing mechanism of the shutter should be set to position for automatic exposure. This leaves the camera operating mechanism in position which is then ready to be operated.

Assuming that the camera has been properly focussed, the battery 56 is placed in the operator's hand in such a position that his thumb will lie immediately over the switch member 57, which may be pressed when it is desired to take the picture. This will cause the current to be established in the wires 55, which in turn will magnetize the magnets 47. The said magnets will draw the armature 48 toward them causing the pin 51 to disengage the member 46. The member 46 will then permit the plate 36 to move in an anti-clockwise direction, as shown in Figure 2. This allows the slot 37 to move in the path that will be inscribed by the movement of the pin 38, permitting the lever 34 to move in a clockwise direction which will move the hook 40, and which in turn will engage the pin 33, causing the notch 30 of the pawl 29 to disengage the pin 25 of the plunger 20. This will permit the spring 23 to move the said plunger toward the finger piece 14, and the rod 13 will thereby be operated and the shutter opened and closed.

After the picture has been taken, the plug 54 may be disengaged from the casing 16, the said casing may then be placed against the shutter plate 10 and folded in the camera with the said plate, if so desired. The battery 56 and the cord 55 may then be placed in the operator's pocket.

I am well aware of the fact that electrical operated mechanisms have been provided for the same purpose for which my device is designed. In fact, this device is an improvement over one previously filed by me, issued January 29, 1918, Number 1,254,931. The device shown in this patent was operative in the same sense some of the other devices that I know of are operative. All of these devices require an entirely too large a battery to actuate the mechanism.

In order to make the device operative, it is necessary to provide a comparatively heavy spring to operate the rod 13 so that the said device will be positively operated. The friction between the pin 25 and the notch 30 is so great that the said notch cannot be disengaged from the pin without considerable power. I have, therefore, provided a spring 44 which is for the purpose of releasing the pawl from said pin. This spring is manually moved to a set position.

By providing the plates 36 in the slot 37 with the pin 38 near the pivot of the said plate 36, I have provided means whereby the said lever 34 may be easily held against movement so that the friction between the pin 51 and the member 46 is so light that a very small current may be made to actuate the armature, and yet the device is provided with such hooking and locking mechanism that it will not be easily set off, except through the action of the armature, and thereby accidental exposures avoided.

Another advantage in my construction lies in the manner in which the knob 22 is mounted so that the operator may know that the mechanism has operated, as the said knob will be adjacent to the walls of the casing 16 if the exposure has been made, and will be in an extended position when set as indicated in the several views.

I claim as my invention:

1. A shutter operating mechanism comprising a casing, a cylinder in said casing having one end open, means for locking the finger piece of a shutter control rod adjacent to said opening with the control button within said cylinder, a spring actuated plunger slidably mounted within said casing designed to operate said button, a catch device for locking said plunger in an operative position, a spring actuated mechanism within said casing for releasing said catch, means for locking said spring actuated mechanism in a set position, and magnetic means for controlling the last said means.

2. A shutter operating mechanism comprising a casing, a cylinder in said casing having one end open, means for locking the finger piece of a shutter control rod adjacent to said opening with the control button within said cylinder, a spring actuated plunger slidably mounted within said casing designed to operate said button, a catch device for locking said plunger in an operative position, a spring actuated mechanism within said casing for releasing said catch, means for locking said spring actuated mechanism in a set position, a hook device for holding the last said means in an operative position, and magnetic means for releasing said hook.

3. The combination of a shutter control device comprising a flexible tube provided with a flanged finger piece at one end and a slidably mounted and extending shutter operating rod, a casing, electrically controlled means within the casing for operating said shutter rod, and means for clamping said finger piece to said casing, the said shutter operating rod extending within said casing to an operative position, said means comprising a pivoted hook member to engage the flange of said finger piece, and a stationary hook to hold the first said hook against movement in one direction.

4. Means for controlling a shutter comprising a casing, a cylinder within said casing having one end open and in communication with the outside of said casing, a plunger slidably mounted within said cylinder, a spring within said cylinder for moving said plunger toward its open end, and said cylinder being provided with a slot, a catch pin in said plunger extending through said slot, a pivoted latch for engaging said pin and for locking said plunger in an operative position, a pivoted lever having one end extending through the sides of said casing, a latch pivoted to said lever and designed to engage said plunger retaining latch, a spring for moving said lever to release said plunger, a cam plate pivoted adjacent to said lever having a groove, a pin in said lever extending in the groove of said cam plate, an electric magnet, a pivoted armature for said magnet, a catch device on said armature designed to engage said cam plate, an electric circuit including a switch for operating said magnets.

5. Means for controlling a shutter comprising a casing, a cylinder within said casing having one end open and in communication with the outside of said casing, a plunger slidably mounted within said cylinder, a spring within said cylinder for moving said plunger toward its open end, and said cylinder being provided with a slot, a catch pin in said plunger extending through said slot, an operating pin mounted in said plunger and extending longitudinally therewith having one end projected through the casing having a knob on its projected end, a pivoted latch for engaging the first said pin and for locking said plunger in an operative position, a pivoted lever having one end extending through the sides of said casing, a latch pivoted to said lever and designed to engage said plunger retaining latch, a spring for moving said lever to release said plunger, a cam plate pivoted adjacent to said lever having a groove, a pin in said lever extending in the groove of said cam plate, an electric magnet, a pivoted armature for said magnet, a catch device for said armature designed to engage said cam plate, an electric circuit including a switch for operating said magnets.

Des Moines, Iowa, May 13, 1921.

BENJAMIN L. PARKER.